United States Patent
Shih et al.

(10) Patent No.: US 10,657,079 B1
(45) Date of Patent: May 19, 2020

(54) OUTPUT PROCESSOR FOR TRANSACTION PROCESSING SYSTEM

(71) Applicant: INTERNATIONAL BUSINESS MACHINES CORPORATION, Armonk, NY (US)

(72) Inventors: Nai-Wen Shih, San Jose, CA (US); Jack Chiu-Chiu Yuan, San Jose, CA (US); Jeffrey L. Maddix, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/186,744

(22) Filed: Nov. 12, 2018

(51) Int. Cl.
*G06F 13/16* (2006.01)
*G06F 9/54* (2006.01)

(52) U.S. Cl.
CPC .......... *G06F 13/1673* (2013.01); *G06F 9/546* (2013.01)

(58) Field of Classification Search
None
See application file for complete search history.

(56) References Cited

U.S. PATENT DOCUMENTS

| | | |
|---|---|---|
| 6,381,656 B1 | 4/2002 | Shankman |
| 6,850,252 B1 | 2/2005 | Hoffberg |
| 6,885,641 B1 | 4/2005 | Chan et al. |
| 7,363,398 B2 | 4/2008 | Scott |
| 7,814,218 B1 * | 10/2010 | Knee ........... H04L 69/18 709/230 |
| 2004/0073724 A1 * | 4/2004 | Wilson ........... H04L 49/90 710/52 |
| 2004/0117513 A1 * | 6/2004 | Scott ........... G06F 3/038 710/1 |
| 2005/0058145 A1 * | 3/2005 | Florencio ........... G10L 19/005 370/412 |

(Continued)

OTHER PUBLICATIONS

Anon et al. "A Measure of Transaction Processing Power" TandemComputers; Technical Report 85.2; Feb. 1985; PN87609; 34 pgs.

(Continued)

*Primary Examiner* — Ilwoo Park
*Assistant Examiner* — Aurangzeb Hassan
(74) *Attorney, Agent, or Firm* — Cantor Colburn LLP; Teddi Maranzano

(57) ABSTRACT

Methods, systems and computer program products for operating an output processor a transaction processing system are provided. Aspects include receiving a request by an output processor to deliver an output message having a plurality of message segments and obtaining a target buffer size. Aspects also include allocating an output buffer for the output message, the output buffer having the target buffer size and iteratively obtaining a message segment of the plurality of message segments and storing the message segment in the output buffer. Based on a determination that all of the plurality of message segments have been stored, aspects include delivering the output message. Based on a determination that the output buffer is full and that all of the plurality of message segments have not been stored in the output buffer, aspects further include increasing the target buffer size to a maximum buffer size.

14 Claims, 12 Drawing Sheets

(56) References Cited

U.S. PATENT DOCUMENTS

| | | | | |
|---|---|---|---|---|
| 2005/0060481 A1* | 3/2005 | Belonoznik | ........... | G06F 13/385 |
| | | | | 710/315 |
| 2006/0123306 A1* | 6/2006 | Whetsel | ......... | G01R 31/318572 |
| | | | | 714/744 |
| 2019/0095457 A1* | 3/2019 | Gupta | ....................... | G06F 7/16 |
| 2019/0095460 A1* | 3/2019 | Wang | .................... | G06F 3/0604 |

OTHER PUBLICATIONS

Disclosed Anonymously "Method and System for Defining Smart Contracts to Approve Transactions based on State Machine" An IP.com Prior Art Database Technical Disclosure; IP.com No. IPCOM000254911D; IP.com Publication Date: Aug. 13, 2018; 4 pgs.

Disclosed Anonymously "Smart detecting and scheduling Query workload as non-transaction in a Transaction Processing system" An IP.com Prior Art Database Technical Disclosure; IP.com No. IPCOM000244627D; IP.com Jublication Date: Dec. 30, 2015; 5 pgs.

Disclosed Anonymously "System and Method to propogate client-aware and context-aware information as part of XID in a distributed transaction ina cloud environment" An IP.com Prior Art Database Technical Disclosure; IP.com No. IPCOM000243549D; IP.com Publication Date: Sep. 30, 2015; 7 pgs.

Mell, Peter et al. "The NIST Definition of Cloud Computing", National Institute of Standards and Technology, U.S. Department of Commerce; Sep. 2011; 7 pgs.

Porobic, Danica "High Performance Transaction Processing on Non-Uniform Hardware Topologies" These No. 7023; Lausanne, May 2016; 137 pgs.

\* cited by examiner

OUTPUT PROCESSOR FOR TRANSACTION PROCESSING SYSTEM

BACKGROUND

The present invention generally relates to transaction processing systems, and more specifically, to an improved output processor for a high-volume transaction processing system.

Today's transaction processing systems (TPSs) require complex output messages to be returned to their related online banking systems. The size of these output messages can vary in length from a very short message (for example, 100 bytes) to very large messages up to the maximum message size allowed by the TPS (for example, 1 megabyte). The size of the output messages required for the online banking systems can vary throughout the hour, throughout the day, throughout the month, and throughout the year as the online banking customers query different functions in their accounts ranging from daily balance information to year-end tax-related issues. TPS support for "big data" and constant introduction of new application models add to the complexity of delivering transaction output messages to the online Banking Systems from the TPS.

Currently, many TPS systems use the TPS maximum allowable output message size to allocate the TPS output buffer used to return the output message to the distributed online banking systems. This is due to the complexity of the TPS output messages. Each TPS output message can consist of a message prefix and 1 to many message segments, which are obtained from the TPS output queue via a series of get segment calls. The TPS output message can potentially be edited by user-provided output message edit routines, again changing the size of the TPS output message. The maximum allowable TPS output buffer allocation is done to enhance the overall transaction throughput performance of the TPS because every output message will always fit inside the TPS output message buffer, regardless of complexity.

When the TPS uses the Maximum Allowable Output Message Size as the TPS output message buffer size, it consumes unnecessary amounts of physical storage. For a TPS with the throughput rate of 20,000 mobile transactions per second, 20,000 output buffers would be allocated at the same time. If the maximum output buffer size is 1 megabyte for the TPS, 20 gigabytes of physical storage would be needed to deliver these output messages. Because physical storage is a limited system commodity for the underlying hardware environment, the operating system, on which the TPS runs, exhibits either extreme degradation or catastrophic termination events making it impossible for the TPS to deliver these output messages in a timely manner to the online banking systems during peak high-volume periods where transaction receipts can exceed the capacity of the TPS storage management component.

SUMMARY

Embodiments of the present invention are directed to a computer-implemented method for processing transactions. A non-limiting example of the computer-implemented method includes receiving a request by an output processor to deliver an output message having a plurality of message segments and obtaining a target buffer size. The method also includes allocating an output buffer for the output message, the output buffer having the target buffer size and iteratively obtaining a message segment of the plurality of message segments and storing the message segment in the output buffer. Based on a determination that all of the plurality of message segments have been stored, the method includes delivering the output message. Based on a determination that the output buffer is full and that all of the plurality of message segments have not been stored in the output buffer, the method further includes increasing the target buffer size to a maximum buffer size.

Embodiments of the present invention are directed to a system for processing transactions. A non-limiting example of the system includes a memory. The system also includes a processor system communicatively coupled to the memory. The processor system is configured to perform a method including receiving a request by an output processor to deliver an output message having a plurality of message segments and obtaining a target buffer size. The method also includes allocating an output buffer for the output message, the output buffer having the target buffer size and iteratively obtaining a message segment of the plurality of message segments and storing the message segment in the output buffer. Based on a determination that all of the plurality of message segments have been stored, the method includes delivering the output message. Based on a determination that the output buffer is full and that all of the plurality of message segments have not been stored in the output buffer, the method further includes increasing the target buffer size to a maximum buffer size.

Embodiments of the invention are directed to a computer program product for processing transactions. The computer program product includes a computer readable storage medium having program instructions embodied therewith. The program instructions are executable by a processor to cause the processor to perform a method. A non-limiting example of the method includes receiving a request by an output processor to deliver an output message having a plurality of message segments and obtaining a target buffer size. The method also includes allocating an output buffer for the output message, the output buffer having the target buffer size and iteratively obtaining a message segment of the plurality of message segments and storing the message segment in the output buffer. Based on a determination that all of the plurality of message segments have been stored, the method includes delivering the output message. Based on a determination that the output buffer is full and that all of the plurality of message segments have not been stored in the output buffer, the method further includes increasing the target buffer size to a maximum buffer size.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
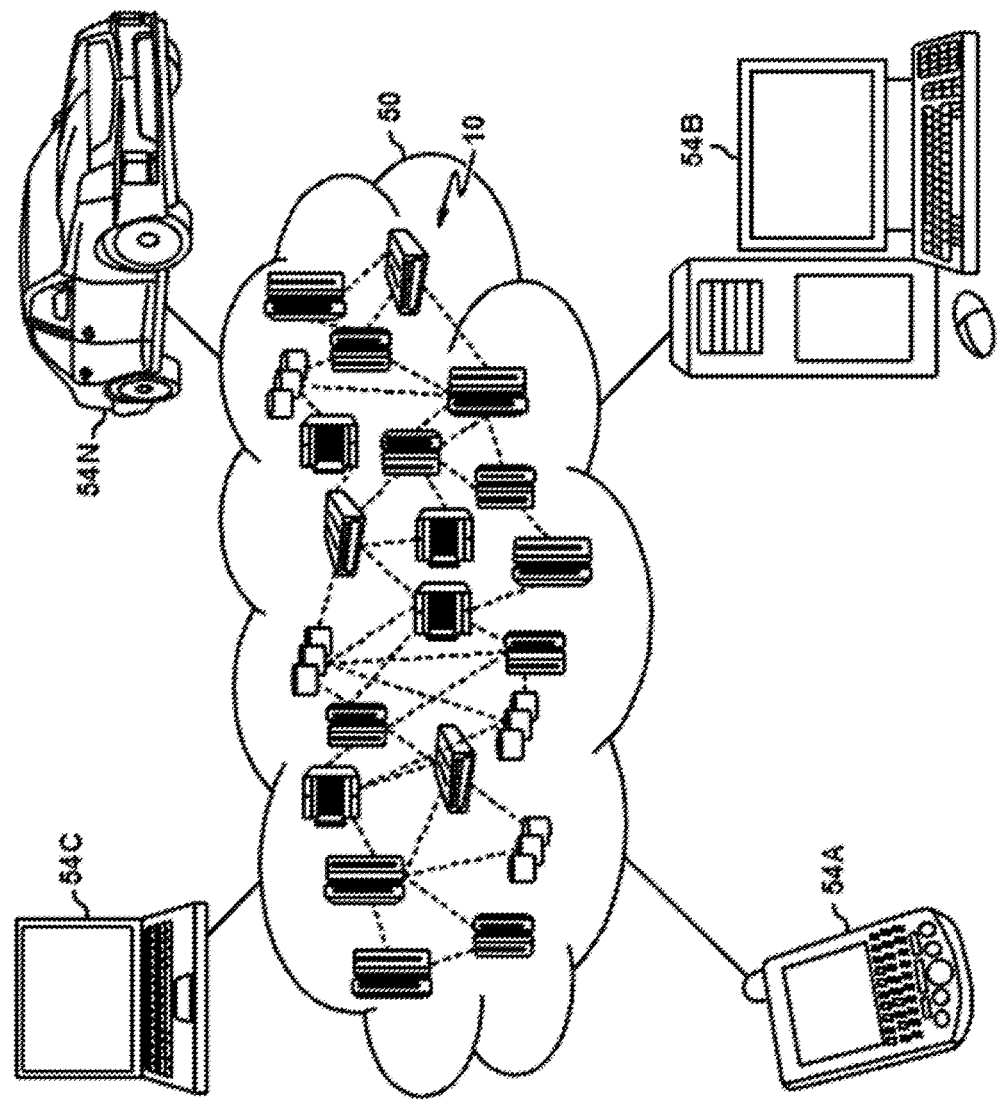
FIG. 1 depicts a cloud computing environment according to an embodiment.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
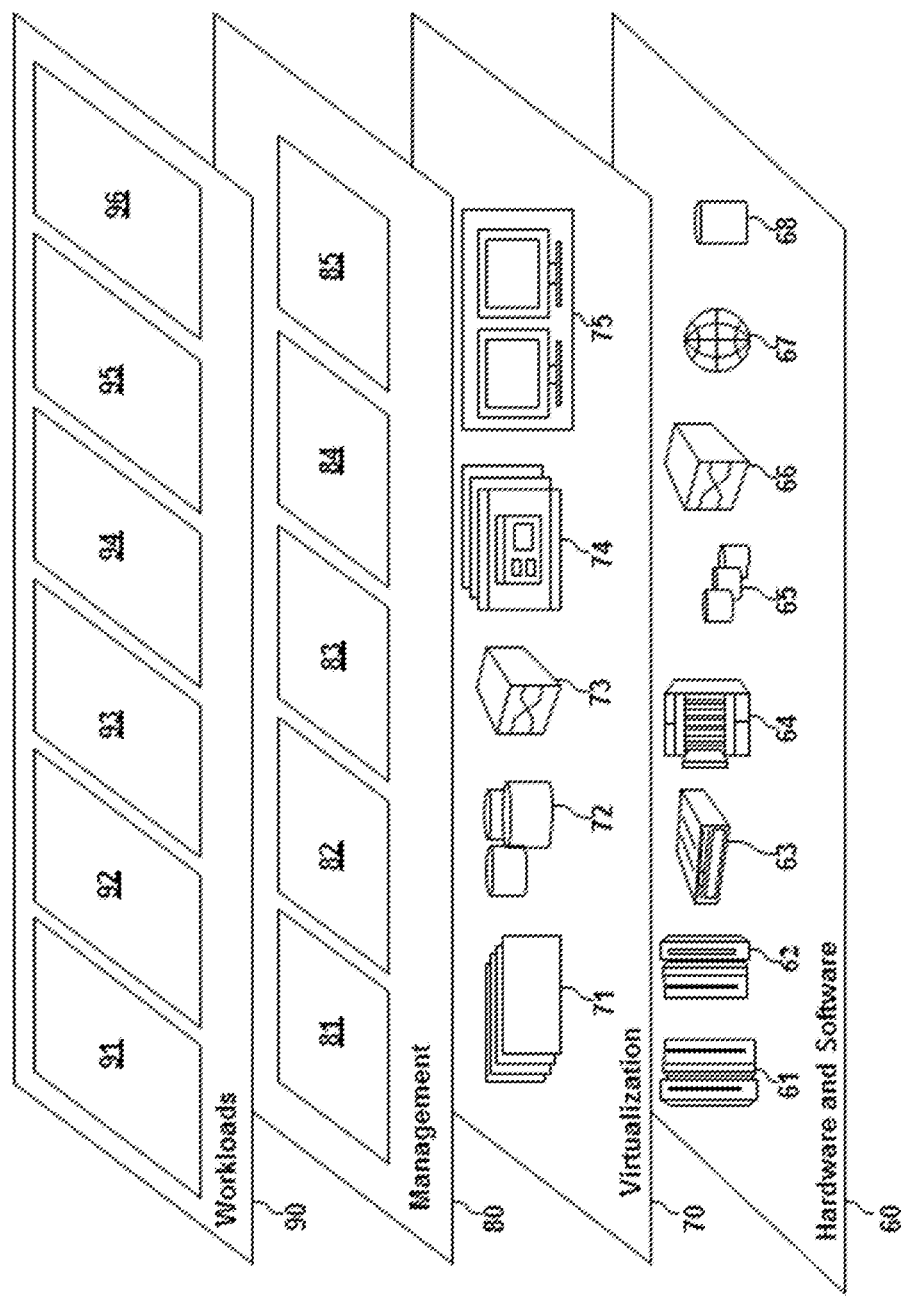
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85, provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing TPS requests/transactions 96.

Figure 3:
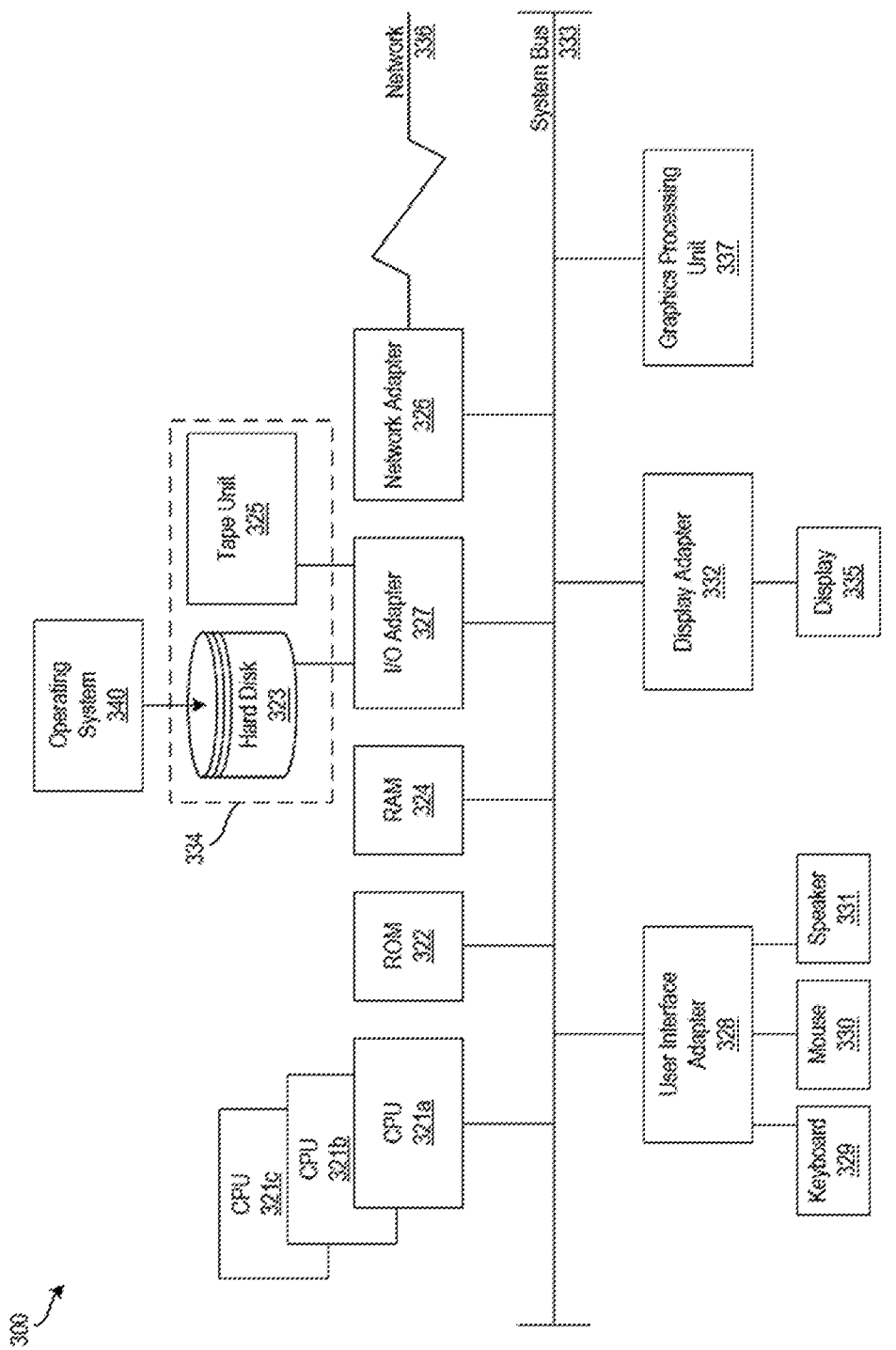
FIG. 3 depicts a block diagram of a processing system for implementing the described techniques according to one or more embodiments described herein.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

In exemplary embodiments, the output processor of the transaction processing system (TPS) is configured to reduce the amount of physical storage consumption required to deliver the transaction output messages to the online banking systems by using a continuous learning and evaluation method to determine a size of a buffer to allocate to outgoing messages. This will enable the TPS to keep pace with the delivery of output messages to the online banking systems by prolonging TPS processing capabilities before reaching the physical storage limitations of the underlying hardware environment of the TPS or completely avoid reaching such physical storage limitation.

Figure 4:
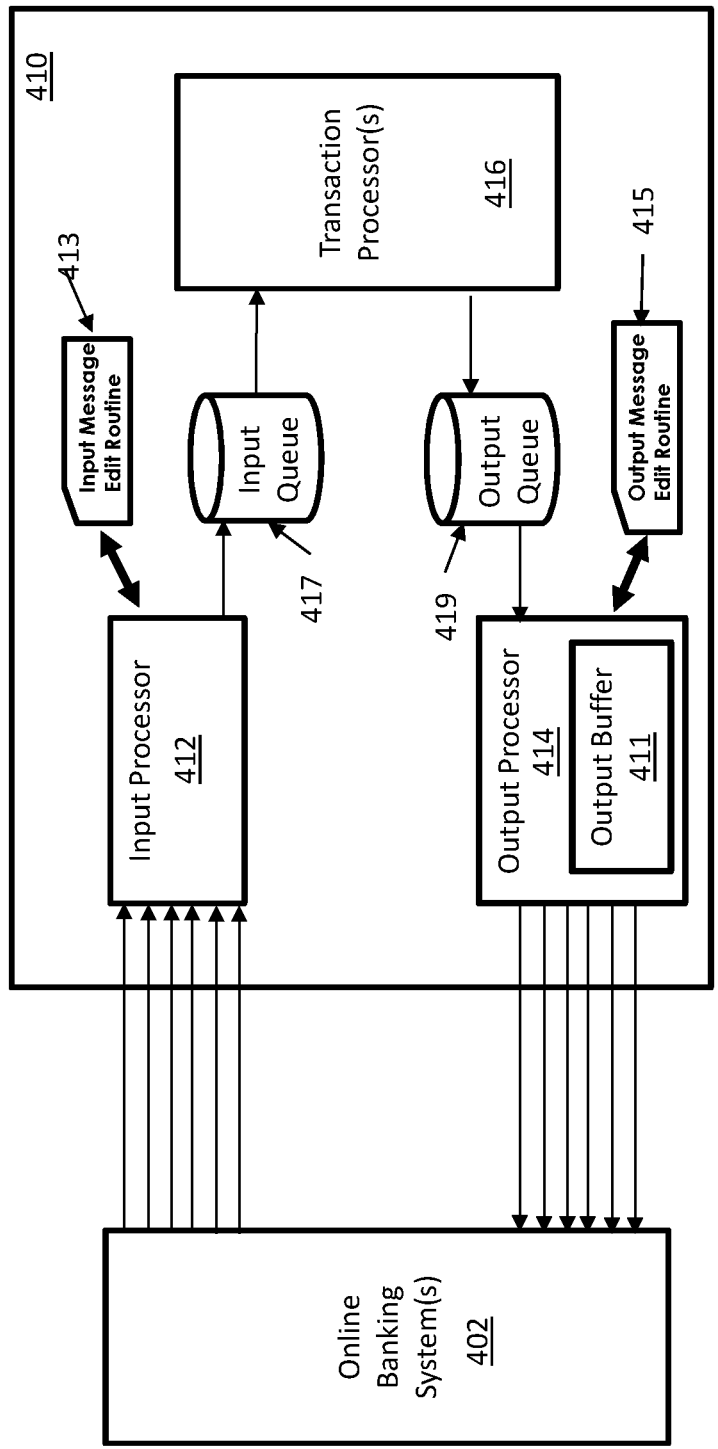
FIG. 4 depicts a system including an online banking system and a transaction processing system in accordance with one or more embodiments.

Referring now to FIG. 4, a block diagram of a system 400 including a transaction processing system (TPS) 410 in accordance with an exemplary embodiment, is shown. The system 400 includes an online banking system in communication with the TPS 410. The TPS 410 includes an input processor 412 configured to receive requests from the online banking system(s) 402. The input processor 412 also receives a request from an input message edit routine 413 and places the received messages in an input queue 417. The transaction processor 416 obtains the requests from the input queue 417, performs the requested processing and provides the requested output data to the output queue 419. In exemplary embodiments, the transaction processor 416 can be embodied as a processing system such as the one shown in FIG. 3 or in a cloud computing environment such as the one shown in FIGS. 1 and 2.

In exemplary embodiments, the output processor 414 of the TPS 410 is configured to process output messages from the output message queue. The output processor 414 synchronously processes each of the output message segments in the queue and then delivers the message to the online banking systems using the current TPS output message buffer 411 allocated for that message. The output processor 414 is configured to continuously operate in a learning mode that includes multiple learning cycles that each span a predefined number of output messages, which can optionally be defined by a user. While the output processor 414 is operating in the learning mode, a variable is used to hold the current TPS output buffer size. The current TPS output buffer size is set to a maximum allowable output message size for the first learning cycle. In one embodiment, the maximum allowable output message size is a variable controlled by the TPS. During the learning cycle, the output processor 414 will allocate the current TPS output buffer based on the current TPS output buffer size then proceed to process the next available output message from the output message queue. The output processor 414 will synchronously process each of the output message segments into the current TPS output buffer then deliver the message to the online banking system.

In exemplary embodiments, during each learning cycle, the TPS output buffer utilization is tracked. If at the end of the current learning cycle, the TPS output buffer utilization is less than a given threshold (example: 50%), the current TPS output buffer size variable is set to the size of the largest message processed during that learning cycle plus a cushion. Therefore, at the end of each learning cycle, a potentially new and improved (smaller) current TPS output message buffer size will be set and used for future TPS output message buffer allocations within the subsequent learning cycle.

Figure 5A:
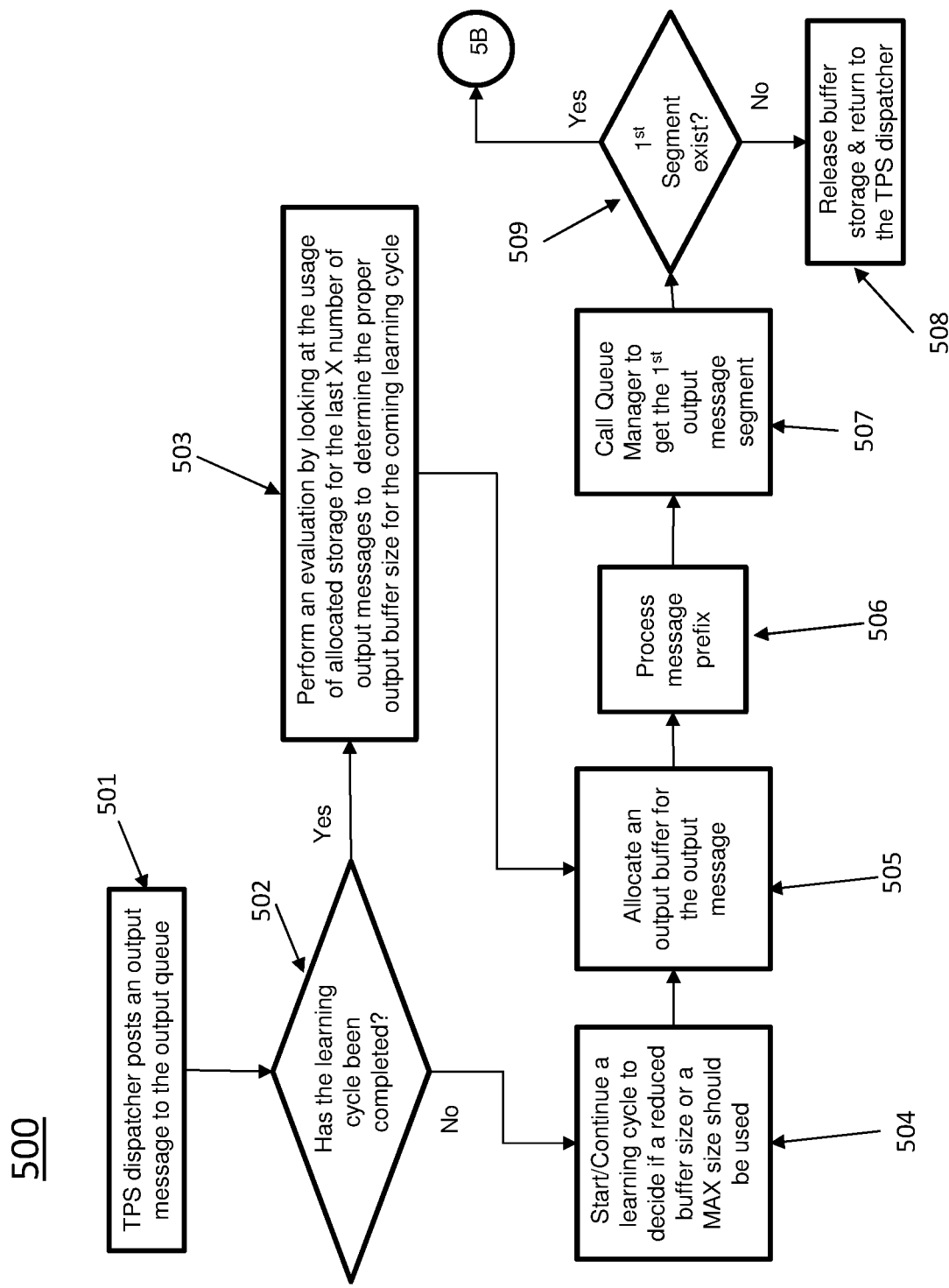
FIGS. 5A and 5B depict flowcharts of a method for operating an output processor a transaction processing system in accordance with one or more embodiments.
Figure 5B:
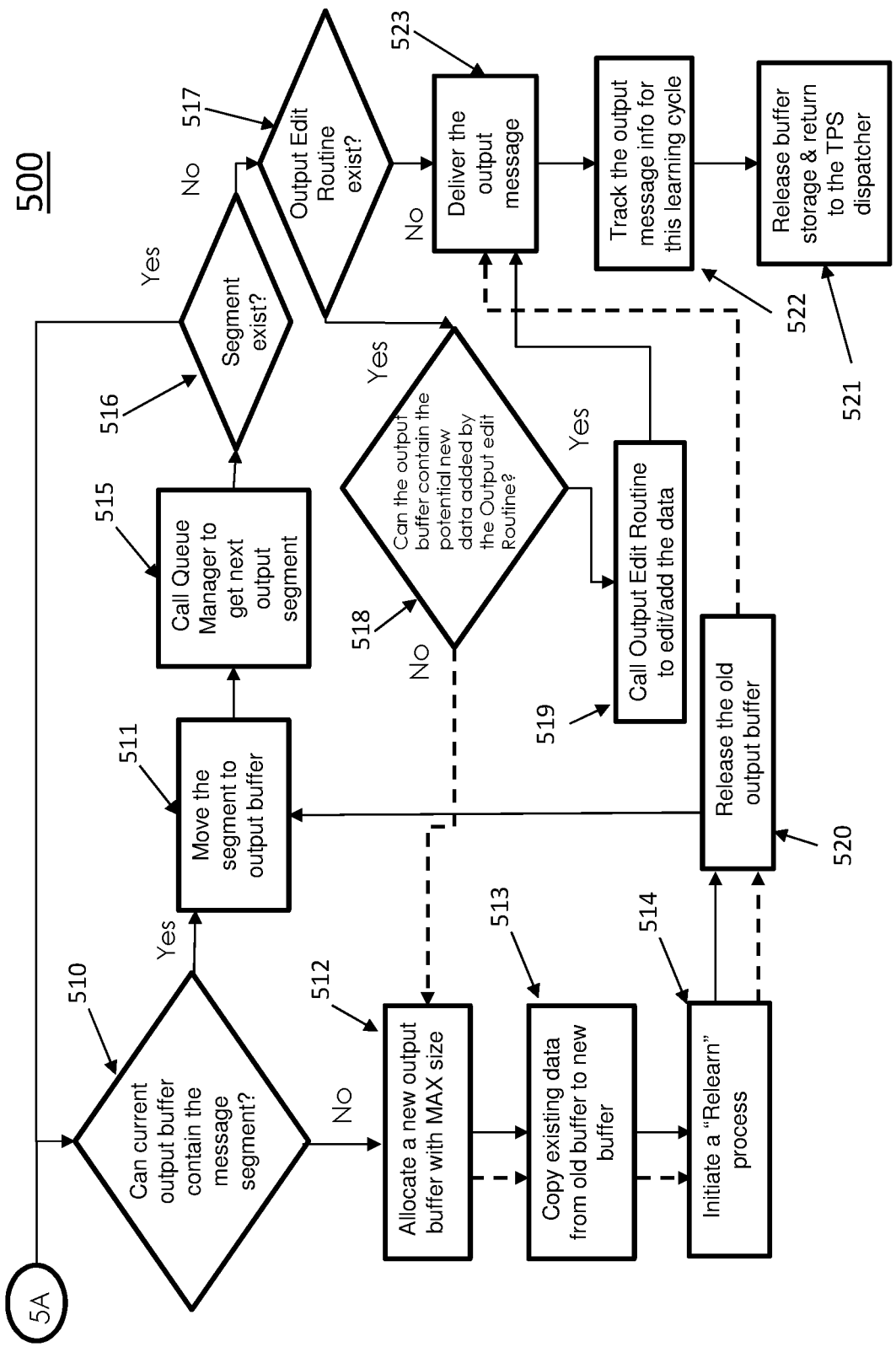

Referring now to FIGS. 5A and 5B flowcharts illustrating a method 500 for operating an output processor a transaction processing system in accordance with an exemplary embodiment are shown. As shown at block 501, the method 500 begins with the TPS dispatcher delivering an output message to the output queue. Next, as shown at decision block 502, method 500 includes determining if a learning cycle has been completed. For example, has the number of messages delivered exceeded a threshold number? If so, the method 500 proceeds to block 503 and performs an evaluation by looking at the usage of allocated storage for the last X number of output messages to determine the proper output buffer size for the coming learning cycle. Otherwise, the method 500 proceeds to block 504 and start/continues a learning cycle to decide if a reduced buffer size or a MAX size should be used. Next, as shown at block 505, the method 500 includes allocating an output buffer for the output message.

The method 500 also includes processing a message prefix for the output message, as shown at block 506. Next, as shown at block 507, the method 500 includes calling the queue manager to get the first output message segment of the output message. At decision block 509, the method 500 determines if the first segment exists and if so the method proceeds to decision block 510. Otherwise, the method 500 includes releasing the buffer storage and return to the TPS dispatcher to obtain the next output message. As shown at decision block 510, method 500 includes determining if the current output buffer can contain the message segment. If so, the method 500 proceeds to block 511 and moves the segment to the output buffer. Otherwise, the method 500 proceeds to block 512 and allocates a new output buffer with MAX size. Next, the method 500 copies existing data from the old buffer to new buffer, as shown at block 513, and then initiates a relearning process, as shown at block 514.

The method 500 also includes calling the queue manager to get next output segment, as shown at block 515. At decision block 516, the method 500 includes determining if the segment exists. If so the method 500 returns to decision block 510. Otherwise, the method 500 proceeds to decision block 517 and determines if an output edit routine exists. If an output edit routine does not exist, the method 500 proceeds to block 523 and delivers the output message. If an output edit routine does exist, the method 500 proceeds to decision block 518 and determines if the output buffer can contain the new data added by the output edit routine. If the output buffer can contain the new data added by the output edit routine, the method 500 proceeds to block 523. Otherwise, the method 500 returns to block 512.

Figure 6:
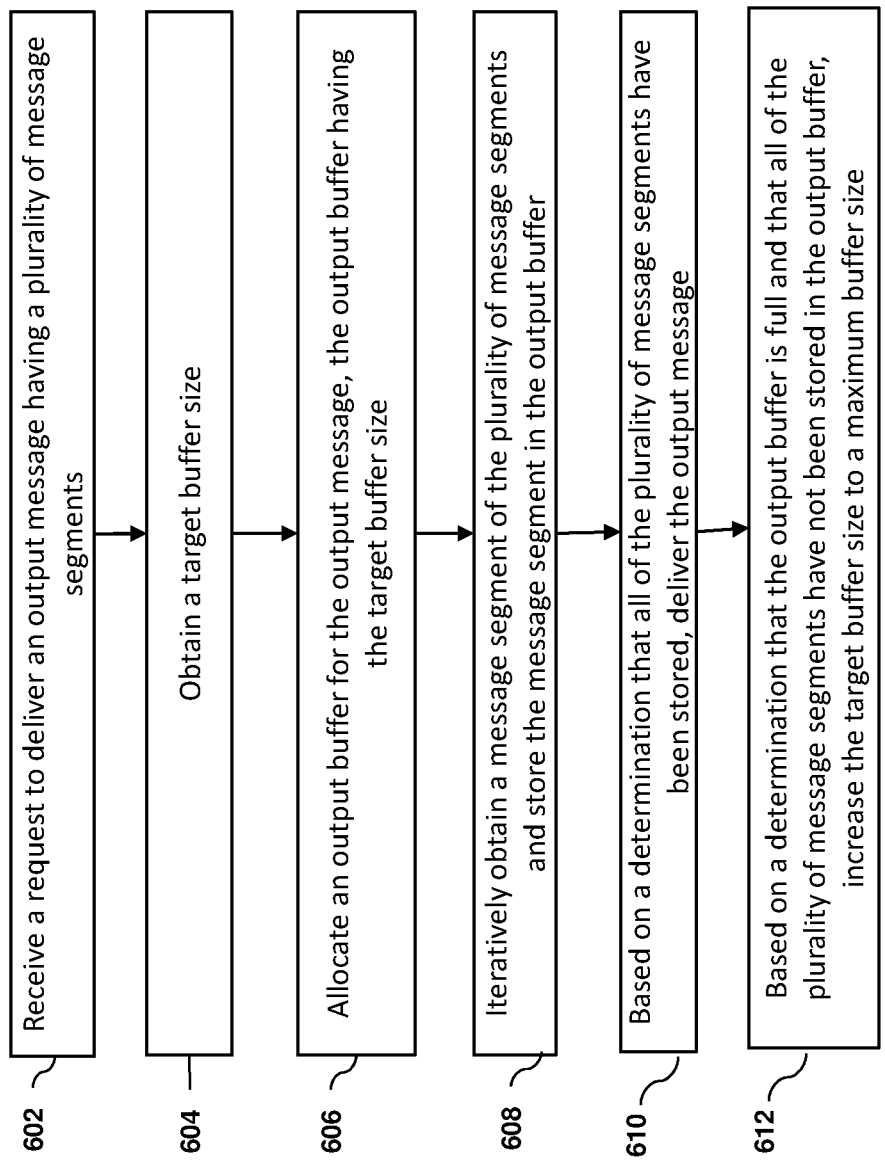
FIG. 6 depicts a method for operating an output processor a transaction processing system in accordance with one or more embodiments.

Referring now to FIG. 6 a flowchart illustrating a method 600 for operating an output processor a transaction processing system in accordance with an exemplary embodiment are shown. As shown at block 602, the method 600 includes receiving a request to deliver an output message having a plurality of message segments. Next, as shown at block 604, the method 600 includes obtaining a target buffer size. In exemplary embodiments, the target buffer size is the current TPS output message buffer size maintained by the output buffer and the target buffer size is obtained based on an analysis of a number of previously delivered output messages by the output processor. The method 600 also includes allocating an output buffer for the output message, the output buffer having the target buffer size, as shown at block 606.

The method 600 further includes iteratively obtaining a message segment of the plurality of message segments and storing the message segment in the output buffer, as shown at block 608. Next, as shown at block 610, the method 600 includes delivering the output message based on a determination that all of the plurality of message segments have been stored. Based on a determination that the output buffer is full and that all of the plurality of message segments have not been stored in the output buffer, the method 600 includes increasing the target buffer size to a maximum buffer size, as shown at block 612.

In exemplary embodiments, the target buffer size is obtained based on an analysis of a number of previously delivered output messages by the output processor. The analysis includes identifying a maximum size of a previously delivered output message in the number of previously delivered output messages. The target buffer size is determined to be a fixed percentage greater than the maximum size of a previously delivered output message. For example, the analysis can include inspecting the last one thousand output messages provided by the output processor. In this example, assume that the size of the largest message analyzed was 256 k, the output processor is configured to set the target buffer size to be about 300 k, or a twenty percent larger than the largest message.

In exemplary embodiments, the target buffer size is obtained based on an analysis of previously delivered output messages by the output processor during a time period. The analysis includes identifying a maximum size of a previously delivered output message during the time period. The target buffer size is determined to be a fixed percentage greater than the maximum size of a previously delivered output message. For example, the analysis can include inspecting the output messages that were provided by the output processor during the previous ten minutes. In this example, assume that the size of the largest message analyzed was 256 k, the output processor is configured to set the target buffer size to be about 300 k, or a twenty percent larger than the largest message.

Referring now to FIGS. 7A, 7B, 7C, 7D, and 7E are flowcharts illustrating a method 700 for operating an output processor a transaction processing system in accordance with an exemplary embodiment are shown. In FIGS. 7A, 7B, 7C, 7D and 7E, the following variables are used: B is the allocated buffer size for this output message, it could be M or smaller (Current TPS Output Buffer Size); M: is the maximum possible size of output buffer for the TPS; Z is the space left in allocated output buffer; L is the real size of an output message; K is the largest real output message size for the X messages learned (This is the high water mark.); T is the accumulated output message size for the last X messages learned (actually used storage); C is the number of output message learned so far in this learning cycle; X is a constant to identify the number of output messages to learn before TPS initiate an evaluation; R is the TPS output buffer utilization ratio; and N is the cushion for buffer expansion.

Figure 7A:
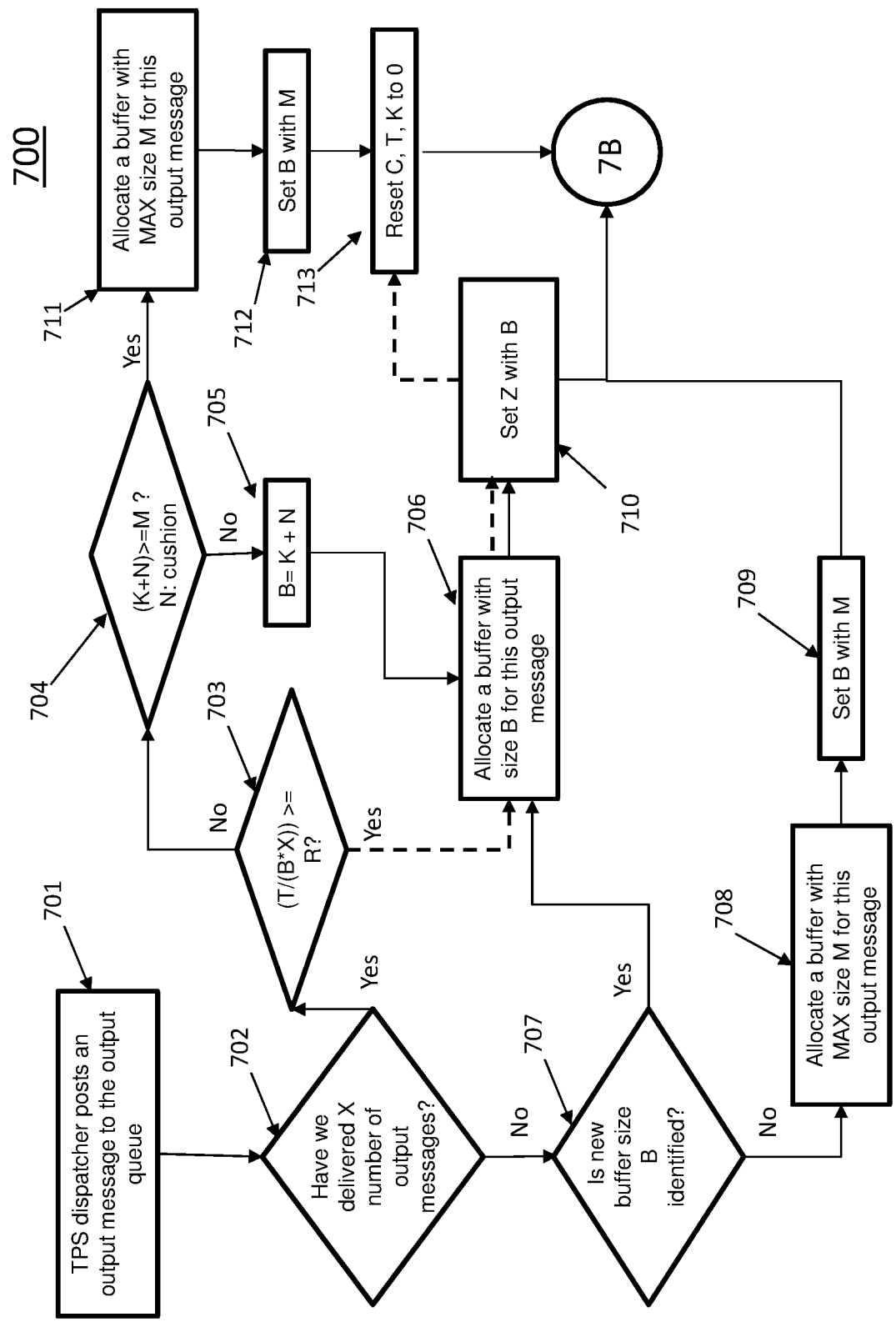
FIGS. 7A, 7B, 7C, 7D, and 7E depict flowcharts of a method for operating an output processor a transaction processing system in accordance with one or more embodiments.

Referring now to FIG. 7A, as shown in block 701, the method 700 includes a dispatched of the TPS delivering a request to post an output message. Next, as shown at decision block 702, the method 700 includes determining if a threshold number, X, output messages have been delivered? If so, the method 700 proceeds to decision block 703 and determines if (T/(B*X)>=R. Otherwise, the method 700 proceeds to decision block 707 and determine if a new buffer size, B, has been identified. If so, the method 700 proceeds to block 706 and allocates a buffer with size B for the output message. Otherwise, the method 700 to block 708 and allocates a buffer with a MAX size, M, for the output message. Next, the method 700 includes setting B to be equal to M. If, at decision block 703, it is determined that (T/(B*X)>=R, the method proceeds to block 706. Otherwise, the method 700 proceeds to decision block 704 and determines if (K+N)>=M. If so the method 700 proceeds to block 711 and allocates a buffer with Max size M for the output message. Otherwise, the method 700 proceeds to block 705 and sets B to be equal to K+N. As shown at block 710, the method sets Z to equal N and at block 712 the method sets B to equal M. The method 700, further includes resetting C, T and K to zero.

Figure 7B:
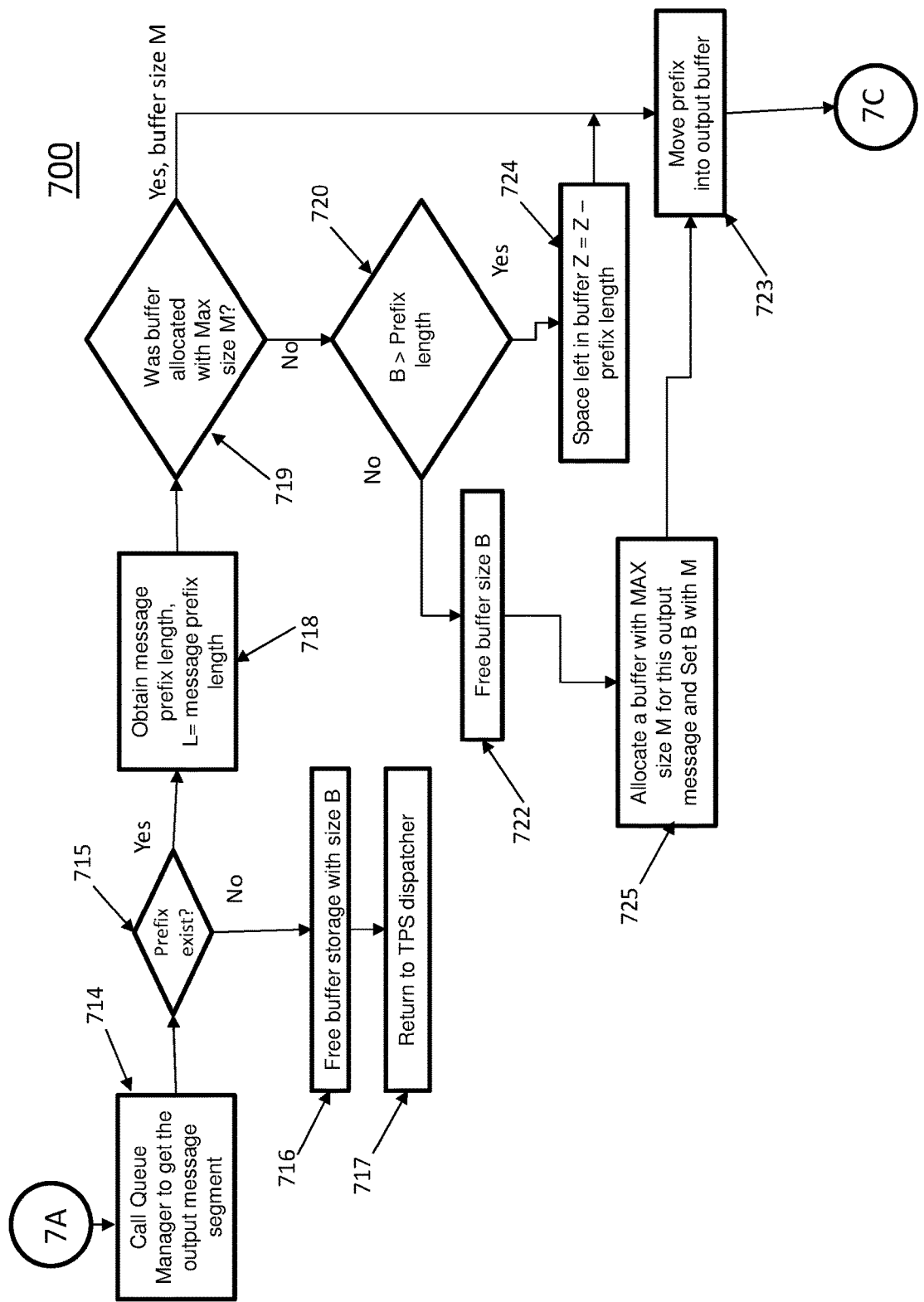

Referring now to FIG. 7B, as shown in block 714, the method 700 includes calling a queue manager to get the output message segment. The method 700 also includes determining if a prefix of the output message exists, as shown at decision block 715. If a prefix does not exist, the method 700 proceeds to block 716 and frees buffer storage with size B, as shown at block 716, and then returns to the TPS dispatcher, as shown at block 717. If the prefix does exist, the method 700 proceeds to block 718 and obtains a prefix message length, L. The method 700 then determines if the buffer was allocated with MAX size, M. If the buffer was allocated with MAX size, the method 700 proceeds to block 723 and moves the prefix into the output buffer. Otherwise, the method 700 proceeds to decision block 720 and determines if B is greater than the prefix length. If so, the method 700 proceeds to block 724 and decreases the space left in the buffer Z to be Z minus the prefix length. Otherwise, the method proceeds to block 722 and frees a buffer with size B, allocates a buffer with MAX size M for the output message and sets B to be equal to M Next, as shown at block 723, the method 700 includes moving the prefix into the output buffer.

Figure 7C:
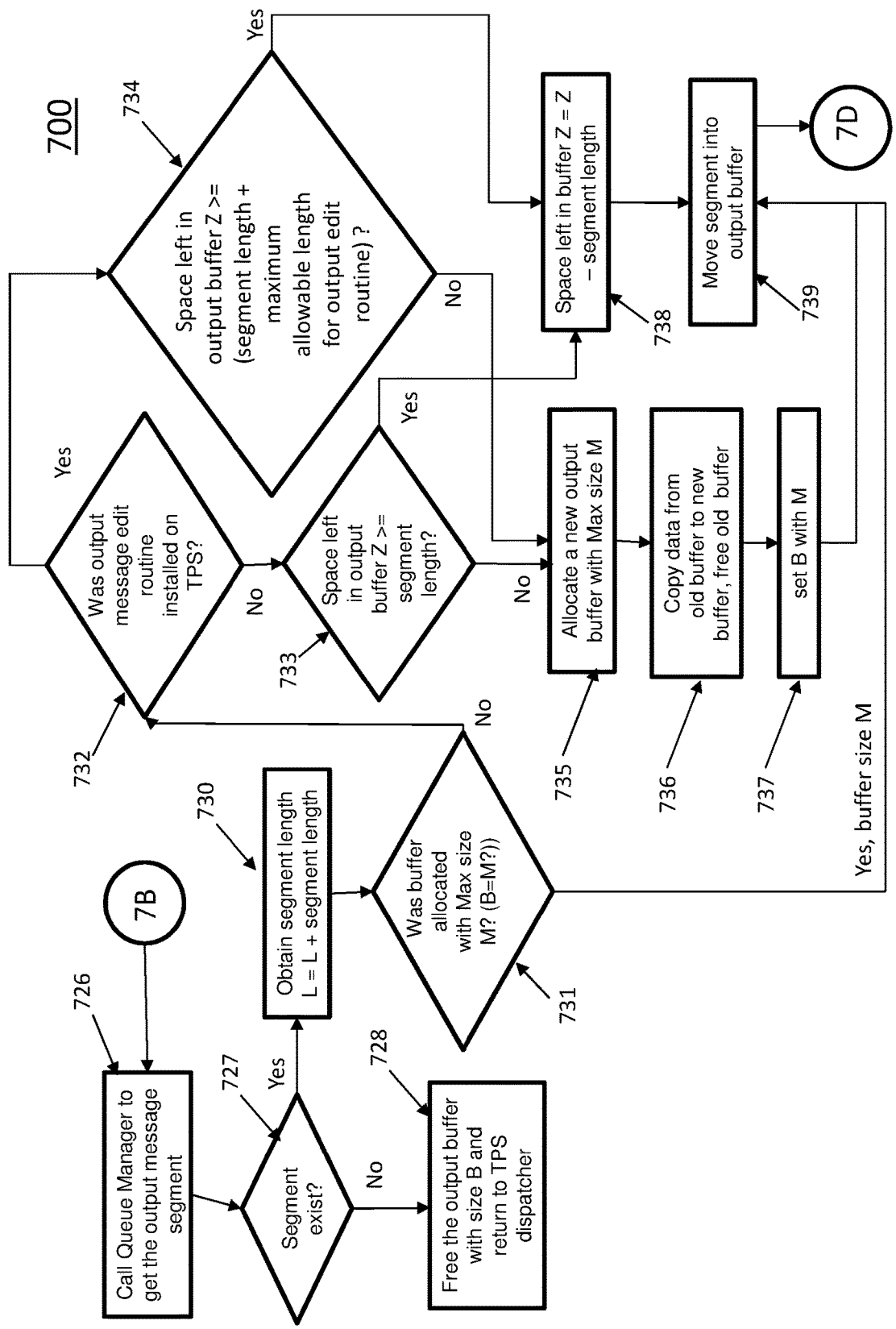

Referring now to FIG. 7C, as shown in block 726, the method 700 includes calling the queue manager to get an output message segment. Next, at decision block 727, the method 700 includes determining if the message segment exists. If so, the method 700 proceeds to block 730 and obtains a length of the segment and updates L to be L plus the length of the segment. Otherwise, the method proceeds to block 728 and frees buffer storage with size B and returns to the TPS dispatcher. At decision block 731 the method 700 includes determining if the buffer was allocated with the MAX size M. If so, the method 700 proceeds to block 739 and moves the segment to the output buffer. Otherwise, the method 700 proceeds to decision block 732 and determines if an output message edit routine is installed on the TPS. If an output message edit routine is installed on the TPS, the method 700 proceeds to block 734 and determines if the space left in the output buffer, Z, is greater than the segment length plus the maximum allowable length for the output edit routine. If so, the method 700 proceeds to block 738 and the space left in the buffer is decreased by the segment length. Otherwise, the method proceeds to block 735 and allocates a new output buffer with MAX size M. If an output message edit routine is not installed on the TPS, the method 700 proceeds to block 733 and determines if the space left in the output buffer is greater than a segment length. If so, the method proceeds to block 738. Otherwise, the method proceeds to block 735. The method 700 also includes copying data from the old buffer to the new buffer and freeing the old buffer, as shown at block 736. As shown at block 737, the method 700 also includes setting B to equal M.

Figure 7D:
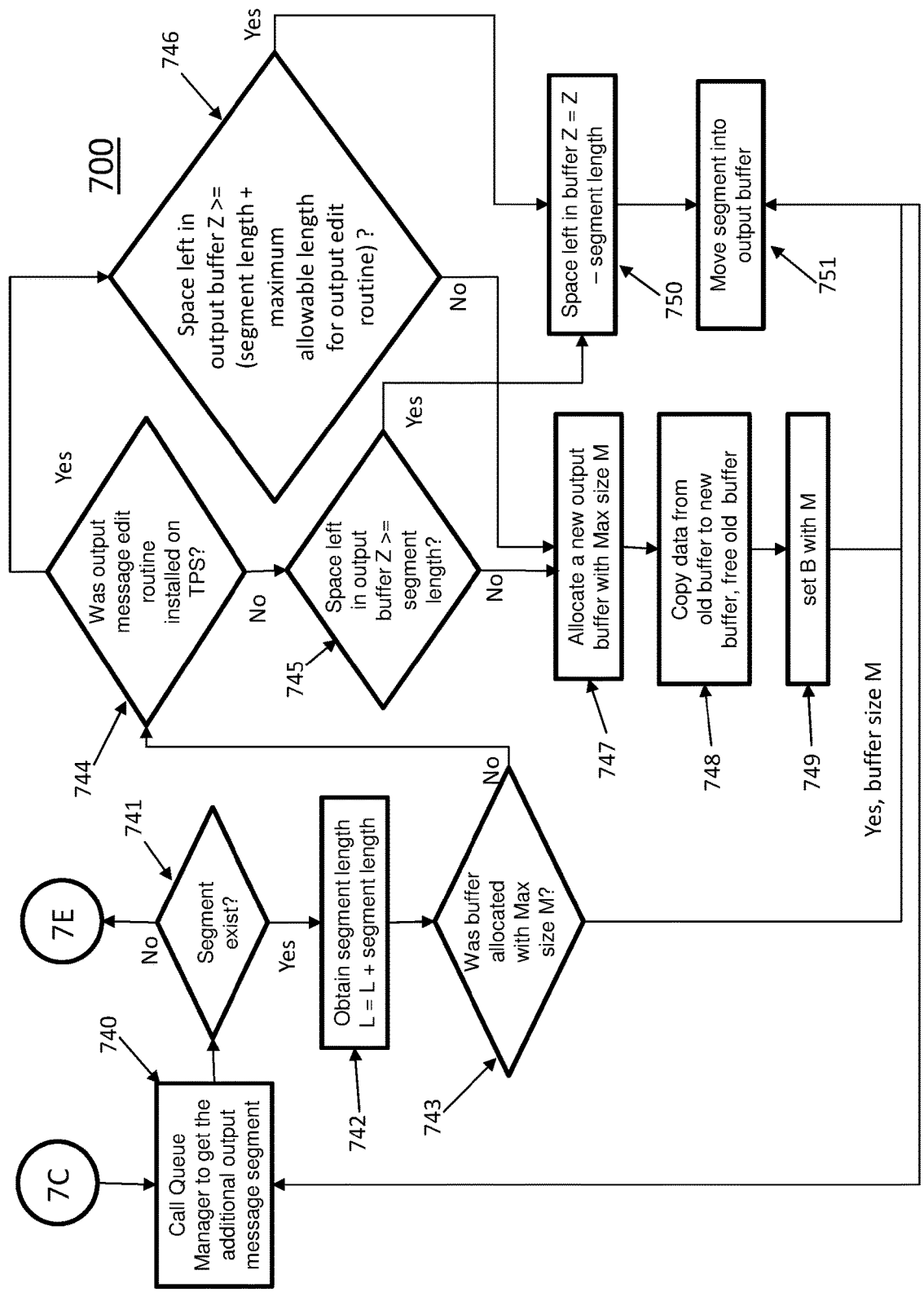

Referring now to FIG. 7D, as shown in block 740, the method 700 includes calling the queue manager to get an additional output segment. Next, as shown at decision block 741, the method 700 includes determining if the segment exists. If so, the method 700 proceeds to block 742 and obtains the segment length. Next, the method 700 includes determining if the buffer was allocated with the MAX size M. If so, the method 700 proceeds to block 751 and moves the segment to the output buffer. Otherwise, the method 700 proceeds to decision block 744 and determine if an output message edit routine is installed on the TPS. If an output message edit routine is installed on the TPS, the method 700 proceeds to block 746 and determines if the space left in the output buffer, Z, is greater than the segment length plus the maximum allowable length for the output edit routine. If so, the method 700 proceeds to block 750 and the space left in the buffer is decreased by the segment length. Otherwise, the method proceeds to block 747 and allocates a new output buffer with MAX size M. If an output message edit routine is not installed on the TPS, the method 700 proceeds to block 745 and determines if the space left in the output buffer is greater than a segment length. If so, the method proceeds to block 750. Otherwise, the method proceeds to block 747. The method 700 also includes copying data from the old buffer to the new buffer and freeing the old buffer, as shown at block 748. As shown at block 749, the method 700 also includes setting B to equal M.

Figure 7E:
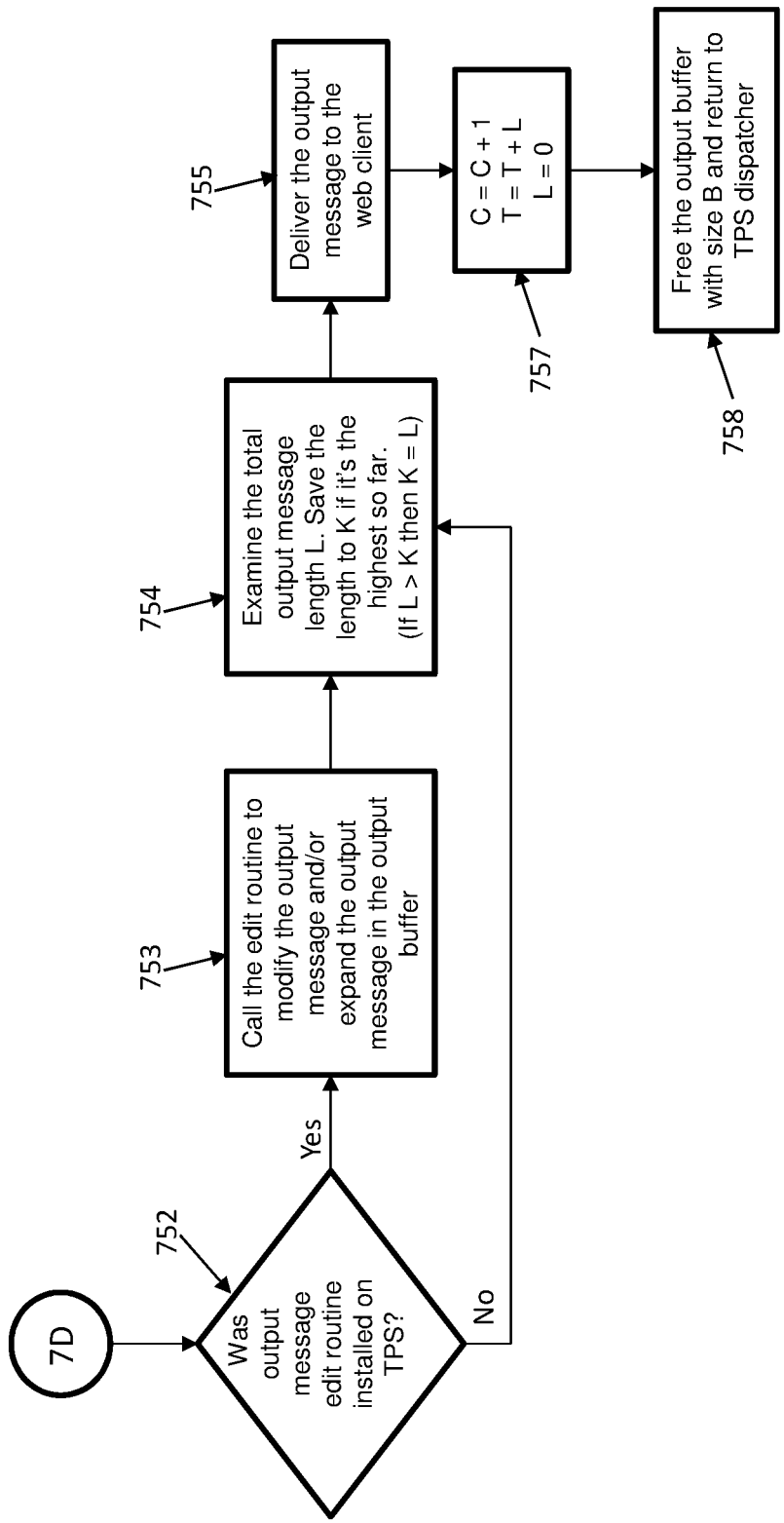

Referring now to FIG. 7E, as shown in decision block 755, the method 700 includes determining if an output message routine is installed on the TPS. If so the method proceeds to block 753 and calls the edit routine to modify the output message and/or expand the output message in the output buffer. Otherwise, the method 700 proceeds to block 754 and examines the total length of the output message L and update K to be equal to L if L is larger than K. Next, as shown at block 755, the method 700 includes delivering the output message to the online banking system. The method also includes incrementing C by one, setting T to be T plus L and resetting L to be equal to zero, as shown at block 756. Next, at block 757, the method includes freeing the output buffer with size B and returning to the TPS dispatcher.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer-implemented method for operating an output processor a transaction processing system, the method comprising:
   receiving a request to deliver an output message having a plurality of message segments;
   obtaining a target buffer size based on an analysis of a number of previously delivered output messages by the output processor, wherein the analysis includes identifying a maximum size of a previously delivered output message in the number of previously delivered output messages;
   allocating an output buffer for the output message, the output buffer having the target buffer size;
   iteratively obtaining a message segment of the plurality of message segments and storing the message segment in the output buffer;
   based on a determination that all of the plurality of message segments have been stored, delivering the output message; and
   based on a determination that the output buffer is full and that all of the plurality of message segments have not been stored in the output buffer, increasing the target buffer size to a maximum buffer size.

2. The method of claim 1, wherein the target buffer size is determined to be a fixed percentage greater than the maximum size of a previously delivered output message.

3. The method of claim 1, wherein the target buffer size is obtained based on an analysis of previously delivered output messages by the output processor during a time period.

4. The method of claim 3, wherein the analysis includes identifying a maximum size of a previously delivered output message during the time period.

5. The method of claim 4, wherein the target buffer size is determined to be a fixed percentage greater than the maximum size of a previously delivered output message.

6. An output processor comprising:
   a memory; and
   a processor system communicatively coupled to the memory;

the processor system configured to perform a method comprising:

receiving a request to deliver an output message having a plurality of message segments;

obtaining a target buffer size based on an analysis of a number of previously delivered output messages by the output processor, wherein the analysis includes identifying a maximum size of a previously delivered output message in the number of previously delivered output messages;

allocating an output buffer for the output message, the output buffer having the target buffer size;

iteratively obtaining a message segment of the plurality of message segments and storing the message segment in the output buffer;

based on a determination that all of the plurality of message segments have been stored, delivering the output message; and based on a determination that the output buffer is full and that all of the plurality of message segments have not been stored in the output buffer, increasing the target buffer size to a maximum buffer size.

7. The output processor of claim 6, wherein the target buffer size is determined to be a fixed percentage greater than the maximum size of a previously delivered output message.

8. The output processor of claim 6, wherein the target buffer size is obtained based on an analysis of previously delivered output messages by the output processor during a time period.

9. The output processor of claim 8, wherein the analysis includes identifying a maximum size of a previously delivered output message during the time period.

10. The output processor of claim 9, wherein the target buffer size is determined to be a fixed percentage greater than the maximum size of a previously delivered output message.

11. A computer program product comprising:

a computer-readable storage medium having program instructions embodied therewith, the program instructions readable by a processor system to cause the processor system to perform a method comprising:

receiving a request by an output processor to deliver an output message having a plurality of message segments;

obtaining a target buffer size based on an analysis of a number of previously delivered output messages by the output processor, wherein the analysis includes identifying a maximum size of a previously delivered output message in the number of previously delivered output messages;

allocating an output buffer for the output message, the output buffer having the target buffer size;

iteratively obtaining a message segment of the plurality of message segments and storing the message segment in the output buffer;

based on a determination that all of the plurality of message segments have been stored, delivering the output message; and based on a determination that the output buffer is full and that all of the plurality of message segments have not been stored in the output buffer, increasing the target buffer size to a maximum buffer size.

12. The computer program product of claim 11, wherein the target buffer size is determined to be a fixed percentage greater than the maximum size of a previously delivered output message.

13. The computer program product of claim 11, wherein the target buffer size is obtained based on an analysis of previously delivered output messages by the output processor during a time period.

14. The computer program product of claim 13, wherein the analysis includes identifying a maximum size of a previously delivered output message during the time period.

* * * * *